(12) United States Patent
Jorguseski et al.

(10) Patent No.: US 11,190,264 B2
(45) Date of Patent: Nov. 30, 2021

(54) SCHEDULING RECEPTION OF WIRELESS SIGNALS USING RECEIVE BEAMFORMING

(71) Applicants: Koninklijke KPN N.V., Rotterdam (NL); Nederlandse Organisatie Voor Toegepast-Natuurwetenschappelijk Onderzoek TNO, The Hague (NL)

(72) Inventors: Ljupco Jorguseski, Rijswijk (NL); Remco Litjens, Voorschoten (NL); Konstantinos Trichias, Athens (GR)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, The Hague (NL)

( * ) Notice: Subject to any disclaimer, the term of this patent is extended or adjusted under 35 U.S.C. 154(b) by 1 day.

(21) Appl. No.: 16/623,728

(22) PCT Filed: Jun. 21, 2018

(86) PCT No.: PCT/EP2018/066650
§ 371 (c)(1),
(2) Date: Dec. 17, 2019

(87) PCT Pub. No.: WO2018/234495
PCT Pub. Date: Dec. 27, 2018

(65) Prior Publication Data
US 2021/0021327 A1    Jan. 21, 2021

(30) Foreign Application Priority Data
Jun. 22, 2017 (EP) .................................. 17177323

(51) Int. Cl.
*H04W 4/00* (2018.01)
*H04B 7/08* (2006.01)
(Continued)

(52) U.S. Cl.
CPC ........ *H04B 7/086* (2013.01); *H04W 72/0446* (2013.01); *H04W 72/12* (2013.01)

(58) Field of Classification Search
CPC . H04W 72/0446; H04W 72/12; H04W 72/04; H04B 7/086; H04B 7/04; H04B 7/061
See application file for complete search history.

(56) References Cited

U.S. PATENT DOCUMENTS 8,836,577 B2 * 9/2014 Honda ..................... H04Q 9/00
                                                                    342/372
2002/0061768 A1 * 5/2002 Liang .................. H04B 7/0617
                                                                    455/561
(Continued)

FOREIGN PATENT DOCUMENTS

| EP | 1 202 587 A2 | 5/2002 |
| EP | 2 372 940 A1 | 5/2011 |
| WO | WO 2004/088794 A1 | 10/2004 |

OTHER PUBLICATIONS

J. Kim, et al., "Fast Millimeter-Wave Beam Training with Receive Beamforming", Journal of Communications and Networks, vol. 16, No. 5, Oct. 2014, 11 pages.

(Continued)

*Primary Examiner* — Abdelnabi O Musa
(74) *Attorney, Agent, or Firm* — Hamilton, Brook, Smith & Reynolds, P.C.

(57) ABSTRACT

A receiving system (1) is configured to determine reception antenna weights for a plurality of antennas and/or antenna elements for each transmitting system of a plurality of transmitting systems (11, 22-65) for receiving wireless signals using receive beamforming. The receiving system is further configured to determine a schedule for receiving the wireless signals. The schedule indicates a resource allocation for each of the transmitting systems. The resource allocation specifies an allocated time period. The receiving (Continued)

system is also configured to inform each transmitting system of the resource allocation and, for each resource allocation in the schedule, receive a plurality of instances of a wireless signal via the antennas and/or antenna elements and combine the instances by using an antenna configuration which is based on at least reception antenna weights determined in relation to a transmitting system associated with the resource allocation.

15 Claims, 8 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2006/0181456 A1* | 8/2006 | Dai | H01Q 3/26 342/377 |
| 2014/0113639 A1* | 4/2014 | Nakasato | H04L 5/0016 455/450 |
| 2016/0049823 A1 | 2/2016 | Stein et al. | |
| 2016/0105908 A1* | 4/2016 | Li | H04W 74/008 370/329 |
| 2016/0174244 A1* | 6/2016 | Kim, II | H04B 7/0404 370/329 |
| 2016/0301506 A1* | 10/2016 | Halbauer | H04B 7/0617 |
| 2019/0380099 A1* | 12/2019 | Hakola | H04B 7/088 |

OTHER PUBLICATIONS

C. Li, et al., "A Cluster Based On-demand Multi-Channel MAC Protocol for Wireless Multimedia Sensor Networks", IEEE, ICC 2008 proceedings, 2008, pp. 2371-2376.
H. Ochiai, et al, "Collaborative Beamforming for Distributed Wireless Ad Hoc Sensor Networks", Draft, Department of Electrical and Computer Engineering, Yokohama National University, To Appear in IEEE Transactions on Signal Processing, 2005, May 10, 2005, 26 pages.
F. Porcel-Rodríguez, et al., "Clustering and Beamforming for Efficient Communication in Wireless Sensor Networks", MDPI, Journal, Sensors 2016, 16, 1334, Aug. 20, 2016, 14 pages.
B.D. Van Veen, et al, "Beamforming : A Versatile Approach to Spatial Filtering", IEEE ASSP Magazine, Apr. 1988, 21 pages.
European Search Report for European Application No. 17177323.7, Entitled "Scheduling Reception Of Wireless Signals Using Receive Beamforming", dated Nov. 30, 2017, 4 pages.
Extended European Search Report for European Application No. 17177323.7, Entitled "Scheduling Reception Of Wireless Signals Using Receive Beamforming", dated Mar. 16, 2018, 5 pages.
International Search Report and Written Opinion for International Application No. PCT/EP2018/066650, Entitled "Scheduling Reception Of Wireless Signals Using Receive Beamforming", dated Dec. 21, 2018, 20 pages.

* cited by examiner

SCHEDULING RECEPTION OF WIRELESS SIGNALS USING RECEIVE BEAMFORMING

RELATED APPLICATIONS

This application is the U.S. National Stage of International Application No. PCT/EP2018/066650, filed Jun. 21, 2018, which designates the U.S., published in English, and claims priority under 35 U.S.C. § 119 or 365(c) to European Application No. 17177323.7, filed Jun. 22, 2017. The entire teachings of the above applications are incorporated herein by reference.

FIELD OF THE INVENTION

The invention relates to a receiving system for receiving wireless signals from a plurality of transmitting systems and a transmitting system for transmitting a wireless signal to a receiving system.

The invention further relates to a method of receiving wireless signals from a plurality of transmitting systems and a method of transmitting a wireless signal to a receiving system.

The invention also relates to a computer program product enabling a computer system to perform such methods.

BACKGROUND OF THE INVENTION

In the Internet of Things (IoT), sensors play a crucial role. In one application, an area is monitored by a set of battery-powered sensors. A key design aspect of such sensors is energy-efficient operation. The transfer of measurement data from a multitude of sources (the sensor nodes/IoT devices) to a sink (an application server acting as data collector, aggregator and processor) may involve e.g. multi-hop forwarding by the sensor nodes themselves towards some 'special node' that is connected to the Internet via a wireless or wireline connection. Such forwarding may utilize different wireless technologies such as ZigBee or IEEE 802.15.4, and implies a significant degree of energy consumption in the nodes to accommodate the (multi-hop) data transport.

US 2016/0049823 A1 discloses a wireless charging platform for a wireless sensor network in which a radio frequency energy distributor and data aggregator system is configured to aggregate data from sensor nodes and wirelessly transmit power to the sensor nodes using a beamformed RF signal. In this architecture, the sources send their data to the sink in a single hop. Even in a single-hop scenario, the unorganized random channel access procedure and/or the generic transmission of data by the sensors using their on-board (usually omni-directional) antenna may result in reduced achieved bit rates, leading to longer channel air times and hence to increased energy consumption.

SUMMARY OF THE INVENTION

It is a first object of the invention to provide a receiving system for receiving wireless signals from a plurality of transmitting systems, which enables energy efficient data transmission.

It is a second object of the invention to provide a transmitting system for transmitting a wireless signal to a receiving system, which is able to transmit in an energy efficient fashion.

It is a third object of the invention to provide a method of receiving wireless signals from a plurality of transmitting systems, which enables energy efficient data transmission.

It is a fourth object of the invention to provide a method of transmitting a wireless signal to a receiving system, which enables energy efficient data transmission.

According to the invention, the first object is realized in that the receiving system for receiving wireless signals from a plurality of transmitting systems is configured to, for each transmitting system of a plurality of transmitting systems, determine reception antenna weights for a plurality of antennas and/or antenna elements for receiving wireless signals from said transmitting system using receive beamforming, determine a schedule for receiving wireless signals from said plurality of transmitting systems, said schedule indicating a resource allocation for each of said plurality of transmitting systems, said resource allocation specifying an allocated time period, inform each transmitting system of said plurality of transmitting systems of said resource allocation to said transmitting system, and for each resource allocation in said schedule, receive a plurality of instances of a wireless signal via said plurality of antennas and/or antenna elements and combine said instances by using an antenna configuration which is based on at least reception antenna weights determined in relation to a transmitting system associated with said resource allocation.

By avoiding multi-hop forwarding in combination with the high directivity of the reception beam, the transmitting systems may transmit at a lower transmit power or for a shorter amount of time at full power and the energy efficiency of the transmitting systems is thereby enhanced. As an additional advantage, spectral efficiency may be enhanced by avoiding multi-hop forwarding and by the beamforming itself, which reduces interference and allows greater spatial reuse of spectrum. As a further advantage, the coverage of the receiving system may be extended as a result of the (receive) beamforming gain so that, for example, a base station may be able to 'hear' sensors further away.

A schedule (also referred to as visit schedule in this specification) is determined in advance to ensure that the reception beam formed by the receiving system is directed towards the system that is transmitting. This is especially advantageous when the transmitting systems are sensor nodes which transmit measurement reports periodically. If a sensor node were to transmit a request to the receiving system requesting a reception beam to be directed towards the sensor node, every time the sensor node has data to transmit, this request and the response to this request would create overhead and therefore decrease energy and spectral efficiency. Furthermore, this request would likely need to be transmitted when the reception beam is not directed towards the sensor node, decreasing energy and spectral efficiency further.

Said resource allocation may further specify allocated frequency resources. Alternatively, it may be clear to both the transmitting system and the receiving system which frequency resources are to be used, e.g. because the receiving system only receives wireless signals on one frequency channel. An antenna may comprise multiple connected antenna elements that work together as a single antenna to transmit or receive radio waves. The instances of the wireless signal are slight variations of the same wireless signal due to the antennas and/or antenna elements being slightly apart. The wireless signal, received by the receiving system, may be an aggregation of wireless signals transmitted by multiple transmitting systems.

A transmitting system may comprise multiple transmitting devices. The receiving system may be a base station (e.g. an LTE eNodeB), for example. Data units represented by the wireless signals may be delivered to an application server, for example. The schedule may be communicated to the transmitting systems via broadcast or unicast. Preferably, the clocks used by the receiving system and the transmitting systems are synchronized regularly. Said time period may be represented in Coordinated Universal Time or a network operator's time reference or said time may be specified as a difference with respect to the current time. Said schedule may comprise a plurality of allocated time periods per transmitting system and/or the frequency, exact timing and/or transmission duration of a repeating cycle. As an example, the schedule may specify for a certain transmitting system that the start time is 11 h:12 m:05 s.339 ms and that the cycle repeats every hour, i.e. that the subsequent start time is 12 h:12 m:05 s.339 ms.

Said receiving system may be configured to receive information from a transmitting system of said plurality of transmitting systems specifying a requested periodicity of transmissions by said transmitting system, and optionally a requested data size, and determine a resource allocation for said transmitting system based on said requested periodicity of transmissions, and optionally said requested data size. The receiving system may not be able to decide completely freely on how to determine the schedule and it may have to adjust the schedule to the transmission requirements of the transmitting system.

Said receiving system may be configured to receive information specifying a requested time period from a transmitting system of said plurality of transmitting systems and determine a resource allocation for said transmitting system based on said requested time period. A transmitting system may only be able to transmit during a certain time period, e.g. because it is only awake in this certain time period, and may indicate this time period as a requirement and thereby dictate this time period. The requested time period may depend on a measurement schedule of the transmitting system, for example.

Said resource allocation for said transmitting system may specify an allocated time period which falls within said requested time period. The receiving system will use the specified time period as a requirement for when to receive from the transmitting system when determining the schedule.

Said receiving system may be configured to determine for each of said plurality of transmitting systems an estimated transfer time for receiving data from said transmitting system and determine said schedule based on said estimated transfer times. This allows spectrum and time resources with respect to a transmitting system to be made dependent on the estimated transfer time for receiving data from the transmitting system. The estimated transfer time typically depends on the amount of data expected to be received from the transmitting system and on the channel conditions (e.g. signal strength and interference conditions). This makes the schedule more optimal than in a configuration in which each transmitting system is initially assigned the same spectrum and time resources.

Initially, the receiving system may expect to receive the same amount of data from each of the plurality of transmitting systems. Thereafter, the receiving system may fine-tune its expectations based on experience. For example, if the transmitting system needs more spectrum and time resources, it may request these from the receiving system. If the receiving system is not able to direct its reception beam towards the transmitting system for the data not yet transmitted, it may at least be able to allocate more spectrum and time resources in the schedule for the transmission of future data units, e.g. resulting from not yet performed measurements. If the receiving system is not able to direct its reception beam towards the transmitting system, the transmission of the remaining data may then interfere with the next transmission in the schedule and furthermore the channel will have worsened due to the changed reception beam, thereby leading to increased energy and/or spectrum/time resource use and thus reduced energy and/or spectrum/time resource efficiency.

Said receiving system may be configured to determine said schedule while taking into account which one or more of said plurality of transmitting systems are each able to simultaneously transmit wireless signals to multiple base stations. It may be possible to serve some or all of the transmitting systems with multiple cooperating base stations (i.e. multiple cells) and this may result in improved channel and interference conditions.

Said receiving system may be configured to determine said schedule while taking into account which sets of said plurality of transmitting systems are able to transmit wireless signals to a certain base station simultaneously. It may be possible for a single base station to serve some of the transmitting systems simultaneously with the help of multiple beams and this may result in a more efficient use of the transmission spectrum. The instances of the wireless signal (i.e. the slight variations of the same wireless signal due to the antennas and/or antenna elements being slightly apart) may in this case be combined multiple times, each time with a different set of reception antenna weights to extract a signal transmitted by the transmitting system to which the set of reception antenna weights belongs and from which a transmission is expected.

According to the invention, the second object is realized in that the transmitting system, e.g. a sensor node, for transmitting a wireless signal to a receiving system is configured to transmit information to a receiving system, said information specifying a requested periodicity of transmissions by said transmitting system and/or a requested time period in which said transmitting system wants to transmit a wireless signal, receive a schedule from said receiving system, said schedule specifying a time period allocated to said transmitting system, said time period taking into account said information, postpone transmitting a wireless signal representing a data unit to said receiving system until a moment which falls in said allocated time period, and transmit said wireless signal to said receiving system at said moment. The transmitting system may enter a sleep mode until the next measurement needs to be performed, for example. In this sleep mode, the wireless transceiver may still be active periodically, e.g. in order to listen on a paging channel. If the data unit comprises a measured value, the transmitting system may also enter the sleep mode between the measurement being performed and transmission of the data unit.

Said transmitting system may be configured to start measuring a property at a predetermined amount of time before said moment, said data unit being the result of said measurement. The property may be temperature or humidity, for example. The data unit may be a measured value like degrees Celsius, for example. The data unit may be encapsulated in a data packet and the data packet may be transmitted as a wireless signal. By adapting the measurement schedule to the schedule received from the receiving system, the measurement is still 'fresh' when it is transmitted. Furthermore, a longer, uninterrupted sleep duration may be more energy-efficient.

According to the invention, the third object is realized in that the method of receiving wireless signals from a plurality of transmitting systems comprises, for each transmitting system of a plurality of transmitting systems, determining reception antenna weights for a plurality of antennas and/or antenna elements for receiving wireless signals from said transmitting system using receive beamforming, determining a schedule for receiving wireless signals from said plurality of transmitting systems, said schedule indicating a resource allocation for each of said plurality of transmitting systems, said resource allocation specifying an allocated time period, informing each transmitting system of said plurality of transmitting systems of said resource allocation to said transmitting system, and for each resource allocation in said schedule, receiving a plurality of instances of a wireless signal via said plurality of antennas and/or antenna elements and combining said instances by using an antenna configuration which is based on at least reception antenna weights determined in relation to a transmitting system associated with said resource allocation. Said method may be performed by software running on a programmable device. This software may be provided as a computer program product.

According to the invention, the fourth object is realized in that the method of transmitting a wireless signal to a receiving system comprises transmitting information to a receiving system, said information specifying a requested periodicity of transmissions by a transmitting system and/or a requested time period in which said transmitting system wants to transmit a wireless signal, receiving a schedule from said receiving system, said schedule specifying a time period allocated to said transmitting system, said time period taking into account said information, postponing transmitting a wireless signal representing a data unit to said receiving system until a moment which falls in said allocated time period, and transmitting said wireless signal to said receiving system at said moment. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: for each transmitting system of a plurality of transmitting systems, determining reception antenna weights for a plurality of antennas and/or antenna elements for receiving wireless signals from said transmitting system using receive beamforming, determining a schedule for receiving wireless signals from said plurality of transmitting systems, said schedule indicating a resource allocation for each of said plurality of transmitting systems, said resource allocation specifying an allocated time period, informing each transmitting system of said plurality of transmitting systems of said resource allocation to said transmitting system, and for each resource allocation in said schedule, receiving a plurality of instances of a wireless signal via said plurality of antennas and/or antenna elements and combining said instances by using an antenna configuration which is based on at least reception antenna weights determined in relation to a transmitting system associated with said resource allocation.

A non-transitory computer-readable storage medium stores at least a second software code portion, the second software code portion, when executed or processed by a computer, being configured to perform executable operations comprising: transmitting information to a receiving system, said information specifying a requested periodicity of transmissions by a transmitting system and/or a requested time period in which said transmitting system wants to transmit a wireless signal, receiving a schedule from said receiving system, said schedule specifying a time period allocated to said transmitting system, said time period taking into account said information, postponing transmitting a wireless signal representing a data unit to said receiving system until a moment which falls in said allocated time period, and transmitting said wireless signal to said receiving system at said moment.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java(™), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
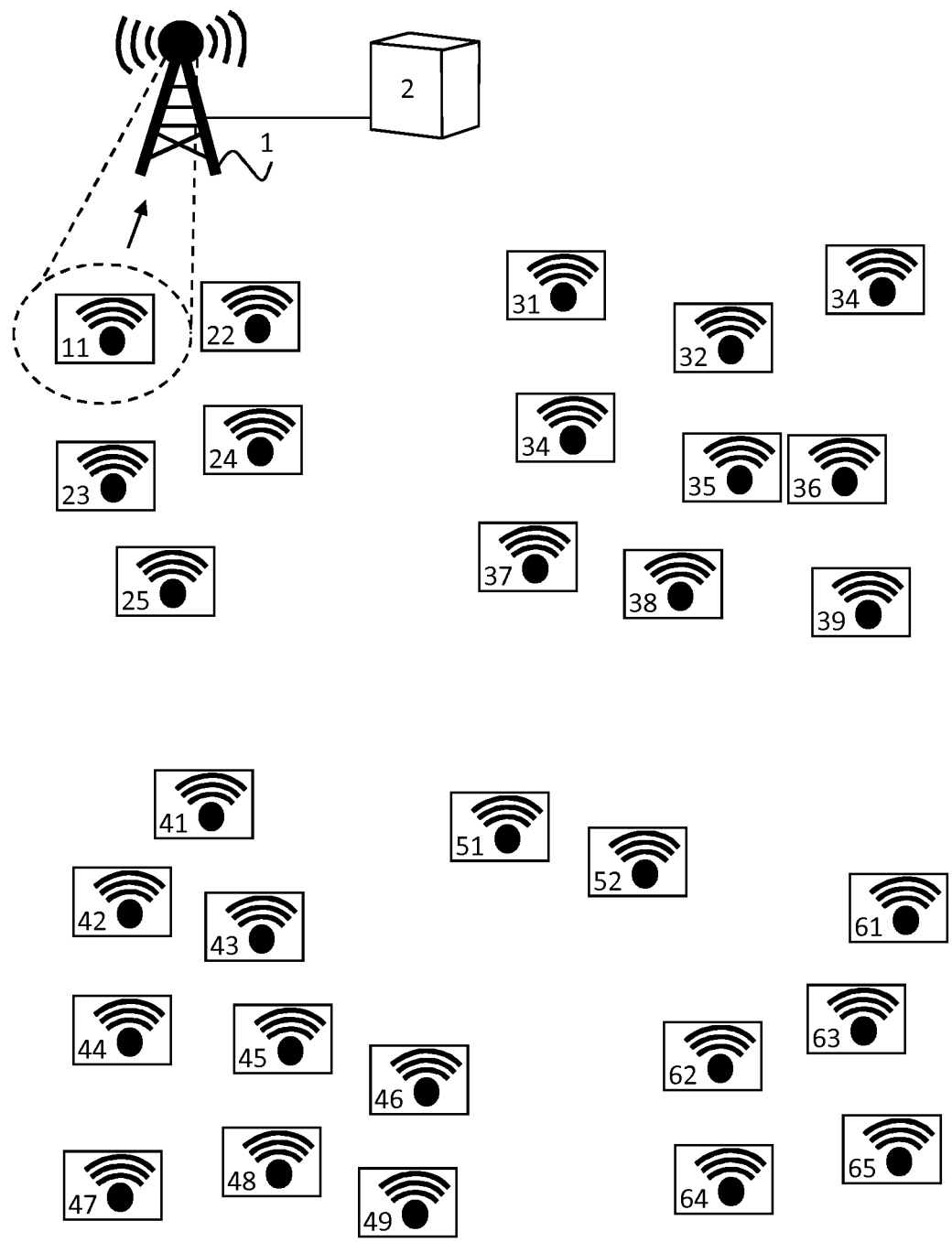
FIG. 1 depicts a first example of a receiving system receiving wireless signals from transmitting systems according to a schedule.

FIG. 1 depicts a first example of a receiving system, in this example base station 1 (e.g. an UMTS NodeB or an LTE eNodeB), receiving wireless signals from a plurality of transmitting systems, in this example sensor node 11 and sensor nodes 22 to 65. The base station 1 is configured to, for each transmitting system of a plurality of transmitting systems, determine reception antenna weights for a plurality of antennas and/or antenna elements for receiving wireless signals from the transmitting system using receive beamforming. The base station 1 is further configured to determine a schedule for receiving wireless signals from the sensor nodes 11 and 22 to 65. The schedule indicates a resource allocation for each of the plurality of transmitting systems. The resource allocation specifies an allocated time period and allocated frequency resources.

The base station 1 is further configured to inform each transmitting system of the plurality of transmitting systems 11 and 22 to 65 of its resource allocation. The base station 1 is also configured to receive a plurality of instances of a wireless signal via the plurality of antennas and/or antenna elements (i.e. to receive slight variations of the same wireless signal due to the antennas and/or antenna elements being slightly apart) and combine the instances by using an antenna configuration which is based on at least reception antenna weights determined in relation to a transmitting system associated with the resource allocation, and to do this for each resource allocation in the schedule.

The sensor node 11 is configured to receive a schedule from the base station 1. The schedule specifies the time period and frequency resources allocated to the sensor node 11. The sensor node 11 is further configured to postpone transmitting a wireless signal representing a data unit to the base station 1 until a moment which falls in the allocated time period and transmit the wireless signal to the base station 1 at this moment. In this embodiment, the sensor node 11 is configured to start measuring a property at a predetermined amount of time before this moment. The data unit is the result of this measurement. The other sensor nodes 22 to 65 are configured in the same manner. In another embodiment, the transmitting systems may be other devices than sensor nodes.

An example of a schedule determined by the base station 1 is provided in Table 1 below.

TABLE 1

| Start time | End time | Bandwidth | Node(s) |
|---|---|---|---|
| 0 h:0 m:00 s.000 ms | 0 h:0 m:00 s.049 ms | 300 KHz | 11 |
| 0 h:0 m:00 s.050 ms | 0 h:0 m:00 s.149 ms | 300 KHz | 22 |
| 0 h:0 m:00 s.150 ms | 0 h:0 m:00 s.199 ms | 300 KHz | 23 |
| 0 h:0 m:00 s.200 ms | 0 h:0 m:00 s.249 ms | 300 KHz | 24 |
| 0 h:0 m:00 s.250 ms | 0 h:0 m:00 s.349 ms | 200 KHz | 25 |
| ... | ... | ... | ... |

The start time and end time may be represented in Coordinated Universal Time or in a network operator's time reference or may represent a difference with the current time, for example. The schedule may comprise a plurality of allocated time periods per node (e.g. 0 h:0 m:00 s.000 ms-0 h:0 m:00 s.049 ms and 0 h:30 m:00 s.000 ms-0 h:30 m:00 s.049 ms for node 11) and/or the frequency, exact timing and/or transmission duration of a repeating cycle (e.g. 60 seconds), for example.

The base station 1 is connected to an application server 2. An application running on the (TCP/IP) application layer of the sensor nodes communicates with an application running on the (TCP/IP) application layer of application server 2. The application layer determines when and what type of sensor node measurements need to be uploaded to the application server 2. As an example, a fixed size report or data set may be uploaded from each sensor node, once a day, starting at 2:00 am. This is typically the case for periodic delay-tolerant reporting of e.g. the structural integrity of dikes or bridges. Incidentally, triggered by e.g. the observation-based anticipation of a calamity, the periodicity of such reporting and/or the report sizes may need to be adapted. Incidental adaptations of the reporting process (periodicity, report sizes) would typically require a renewed application of the same procedure with different parameters.

Figure 2:
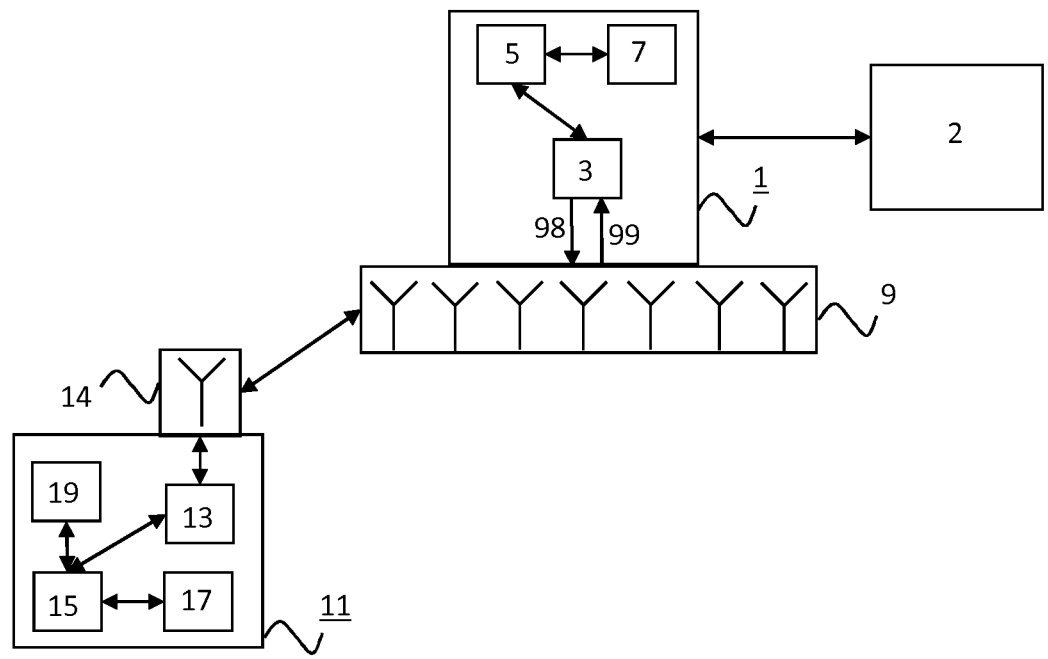
FIG. 2 is a block diagram of embodiments of the systems of the invention.

The base station 1 may comprise a transceiver 3, a processor 5, storage means 7 and an antenna array 9, see FIG. 2. In this embodiment, the processor 5 is configured to determine the schedule and to store it on storage means 7. The processor 5 is configured to determine the reception antenna weights and to use the transceiver 3 to inform the sensor nodes of the schedule. The processor 5 may use the transceiver 3 to receive wireless signals from the plurality of transmitting systems 11 and 22 to 65 based on which the processor 5 determines the reception antenna weights. A sensor node may be informed only of the part of the schedule that is relevant to this particular sensor node or also of the part of the schedule that is relevant to other sensor nodes, e.g. in case schedules are broadcast rather than unicast. The processor 5 is further configured to use the transceiver to receive wireless signals from the sensor nodes via the antenna array 9.

In the embodiment shown in FIG. 2, the base station 1 comprises one processor 5. In an alternative embodiment, the base station 1 comprises multiple processors. The processor 5 of the base station 1 may be a general-purpose processor, e.g. an Intel or an AMD processor, or an application-specific processor, for example. The processor 5 may comprise multiple cores, for example. The processor 5 may run a Unix-based or Windows operating system, for example. The base station 1 may comprise other components typical for a component in a mobile communication network, e.g. a power supply. The storage means 7 may comprise solid state memory, e.g. one or more Solid State Disks (SSDs) made out of Flash memory, or one or more hard disks, for example. In the embodiment shown in FIG. 2, the base station 1 comprises one device. In an alternative embodiment, the base station 1 comprise multiple devices.

In the embodiments shown in FIGS. 1 and 2, the receiving system is a base station. In an alternative embodiment, the receiving system may comprise a base station plus one or more other components/functions of a mobile communication network, e.g. plus one or more other base stations and/or plus a stand-alone device which determines reception schedules for one or more base stations. The receiving system may comprise multiple base stations distributed over multiple sites or one base station working with multiple distributed antennas at different locations (Remote Radio Head (RRH) concept), for example.

The sensor node 11 may comprise a transceiver 13, an antenna 14, a processor 15, storage means 17 and a sensor 19, see FIG. 2. In this embodiment, the processor 15 is configured to run an application that collects sensor data from sensor 19. The application may comprise advanced functionality or only minimal application logic, for example. In the latter case, the sensor node 11 may be controlled by the application server 2 and referred to as a 'dumb' node. The transceiver 13 is configured to receive the schedule from the base station 1 using the antenna 14, as described in relation to FIG. 1, determine the moment which falls in the allocated time period, and enter and stay in a power saving mode until this moment (however, the processor 15 may be able to wake up the transceiver 13 in case it needs to transmit data urgently).

In a first variant, the processor 15 is configured to use the transceiver 13 to receive the schedule from the base station 1, determine a moment at which it needs to wake up based on the schedule, and enter and stay in a power saving mode until this moment. The processor 15 is configured to receive sensor data from sensor 19 at this moment and then use the transceiver 13 to transmit the sensor data in a wireless signal to the base station 1.

In a second variant, the processor 15 is configured to determine a moment $t_0$ at which the sensor node needs to be active (this moment $t_0$ may be pre-configured, e.g. based on a measurement schedule), use the transceiver 13 to receive the schedule from the base station 1, and determine a moment $t_1$ at which it needs to wake up based on the schedule. The processor 15 is configured to enter and stay in a power saving mode until the moment $t_0$, then receive sensor data from sensor 19, enter and stay in a power saving mode until the moment $t_1$, and then use the transceiver 13 to transmit the sensor data in a wireless signal to the base station 1.

In the embodiment shown in FIG. 2, the sensor node 11 comprises one processor 15. In an alternative embodiment, the sensor node 11 comprises multiple processors. The transceiver 13 of the sensor node 11 may use one or more cellular communication technologies such as GPRS, CDMA, UMTS and/or LTE to communicate with the base station 1, for example. The processor 15 may be a general-purpose processor, e.g. an ARM processor, or an application-specific processor. The processor 15 may run a Unix-based operating system, for example. The storage means 17 may comprise solid state memory, for example. The sensor 19 may measure, for example, one or more parameters, e.g. distance, motion, temperature, humidity, etc. The sensor 19 may comprise one or more cameras and/or one or more microphones, for example. The sensor node 11 may comprise other components typical for a sensor node, e.g. a battery.

Figure 3:
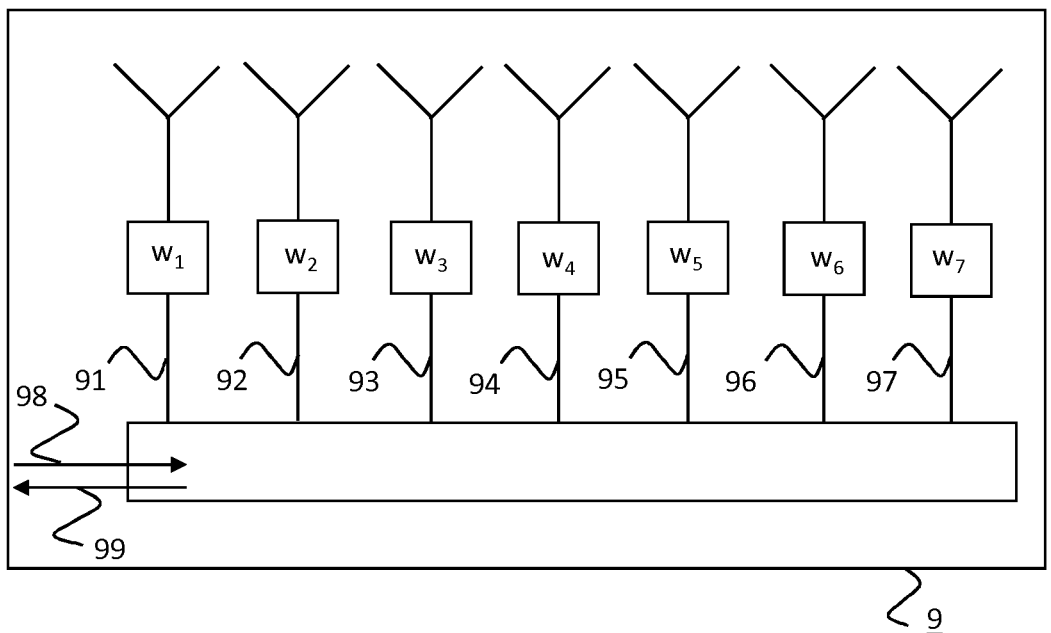
FIG. 3 is a block diagram of the antenna array depicted in FIG. 2.

In the embodiment of the base station 1 shown in FIG. 2, transceiver 3 is coupled to an array of antennas 9. In the embodiment shown in FIG. 3, the array of antennas 9 comprises seven antennas 91-97. The antennas 91-97 of the antenna array 9 may be arranged in a linear configuration, a rectangular configuration, or a circular configuration, for example. Alternatively, the antenna array elements 91-97 may be arranged in a three-dimensional configuration, for example. In the embodiment shown in FIG. 3, analog beamforming is used. In an alternative embodiment, digital beamforming is used, in which the antenna weights are applied in the digital domain, typically by the transceiver 3. In a further alternative embodiment, hybrid beamforming, a combination of analog beamforming and digital beamforming is used. Digital beamforming is used by LTE, for example, while analog beamforming is used by radar technology, for example. Hybrid beamforming is foreseen to be used by 5G millimeter-wave communication, for example.

The processor 5 and/or the transceiver 3 of the base station 1 may be configured to configure the individual antennas 91-97 of antenna array 9 for transmission and reception, e.g. by setting the amplitude and phase of the signals for each of the elements 91-97 of the antenna array 9. The spacing between the antenna array elements 91-97 may be in the order of the wavelength of the electromagnetic waves used for communication, for example. Although the embodiment of the antenna array 9 shown in FIG. 3 comprises seven antennas 91-97, the antenna array 9 could alternatively comprise more or fewer antennas.

The input signal of the antenna array 9 provided by transceiver 3, is denoted by input signal 98. The input signal 98 is the input signal provided by the transceiver 3 to the antenna array 9 and not the signal(s) received by the antennas 91-97. The input signal 98 is processed by an array coefficient for each of the 7 array elements. The array coefficients can be denoted by $w_1, \ldots, w_N$ (N being the number of antennas, N being 7 in this embodiment). To define the operation of the antenna array 9, a complex sinusoidal may be taken for input signal 98, for example. The reason is that the main operation of the antenna array is linear, and any input signal may be decomposed into a sum of complex sinusoidal signals by, for instance, the Fourier transform. The wireless output of the antenna array 9 is then equal to a superposition of the response of the antenna array 9 to the constituent sinusoidal signals of the input signal 98. For a complex sinusoidal input, the wireless output of the ith element of the antenna array may be written as $s_i(t) = w_i(f) e^{j2\pi ft}$, where $w_i(f)$ is a complex number that denotes the array coefficient for the ith antenna. The input signal 98 is thus multiplied by the array coefficients to obtain the wireless output. $w_i$ is in general a function of the frequency.

The output signal of the antenna array, provided to transceiver 3, is denoted by output signal 99. The output signal 99 is the output signal provided by the antenna array 9 to the transceiver 3 to and not the signal(s) transmitted by the antennas 91-97. As before, the operation of the array may be defined in terms of a complex sinusoidal signal. The wireless signal received at the ith antenna may be written as $y_i(t) = R_i e^{j\varphi(i)} e^{j2\pi ft}$. Here $R_i$ is a complex number that denotes the received amplitude and $\varphi(i)$ an additional phase shift which depends on the spatial location of the antenna element. Each of these signals may be multiplied by the array coefficients, and the results summed to generate the output signal 99.

Alternatively, other beamforming architectures may be used. A well-known architecture is the sum-and-delay beamforming architecture. The array coefficients that multiply the complex sinusoid signals effectively implement a phase shift of these sinusoidal signals. In case the transmitted or received signal is narrow-band, the phase shift may be replaced by a time delay, which leads to the sum-and-delay architecture. The choice of the array coefficients determines the antenna pattern that is generated. Many methods exist to choose these coefficients. Furthermore, several constraints may be taken into account when designing the array coefficients. An overview of several methods is given in "Beamforming: A Versatile Approach to Spatial Filtering", B. D. Van Veen et al, IEEE ASSP Magazine, April 1988.

In addition to receive beamforming, the base station 1 may use transmit beamforming to transmit wireless signals to the sensor nodes 11,22-65 of FIG. 1. Alternatively, the base station 1 may use the same array coefficients for all transmissions to the sensor nodes 11,22-65 of FIG. 1, for example. The input signal 98 comprises the signal that has been received by the antenna array 9 via the antennas 91-97 using receive beamforming. The output signal 99 comprises the signal that is transmitted by the antenna array 9 via the antennas 91-97, possibly using transmit beamforming. The array coefficients to be used by the antenna array 9 may be encoded in the input signal 98 or may be provided to the antenna array 9 separately. One or more of the sensor nodes may also be configured to use transmit beamforming and/or receive beamforming.

Two phases may be distinguished in the process performed by the base station 1 of FIG. 2: In the initialization phase, the base station determines the reception antenna weights and the schedule and transmits the schedule to the sensor nodes 11,22-65. In the reception phase, the base station 1 receives wireless signals comprising data units from the sensor nodes 11,22-65.

The initialization phase starts with a so-called beam training procedure in which the base station determines the optimal beam for each sensor node. The optimal beam is represented by reception antenna weights determined for the plurality of antennas and/or antenna elements of the base station. Usually, most sensor nodes are light-weight devices equipped only with a basic omni-directional antenna, incapable of any sort of beamforming. In these cases, only the base station may perform the beam training process (for forming a listening beam). However, sometimes a sensor node is equipped with a more advanced antenna capable of beamforming. In this case, both the base station and the node may perform a beam training process, the former optimizing its listening beam and the latter optimizing its transmit beam.

Figure 4:
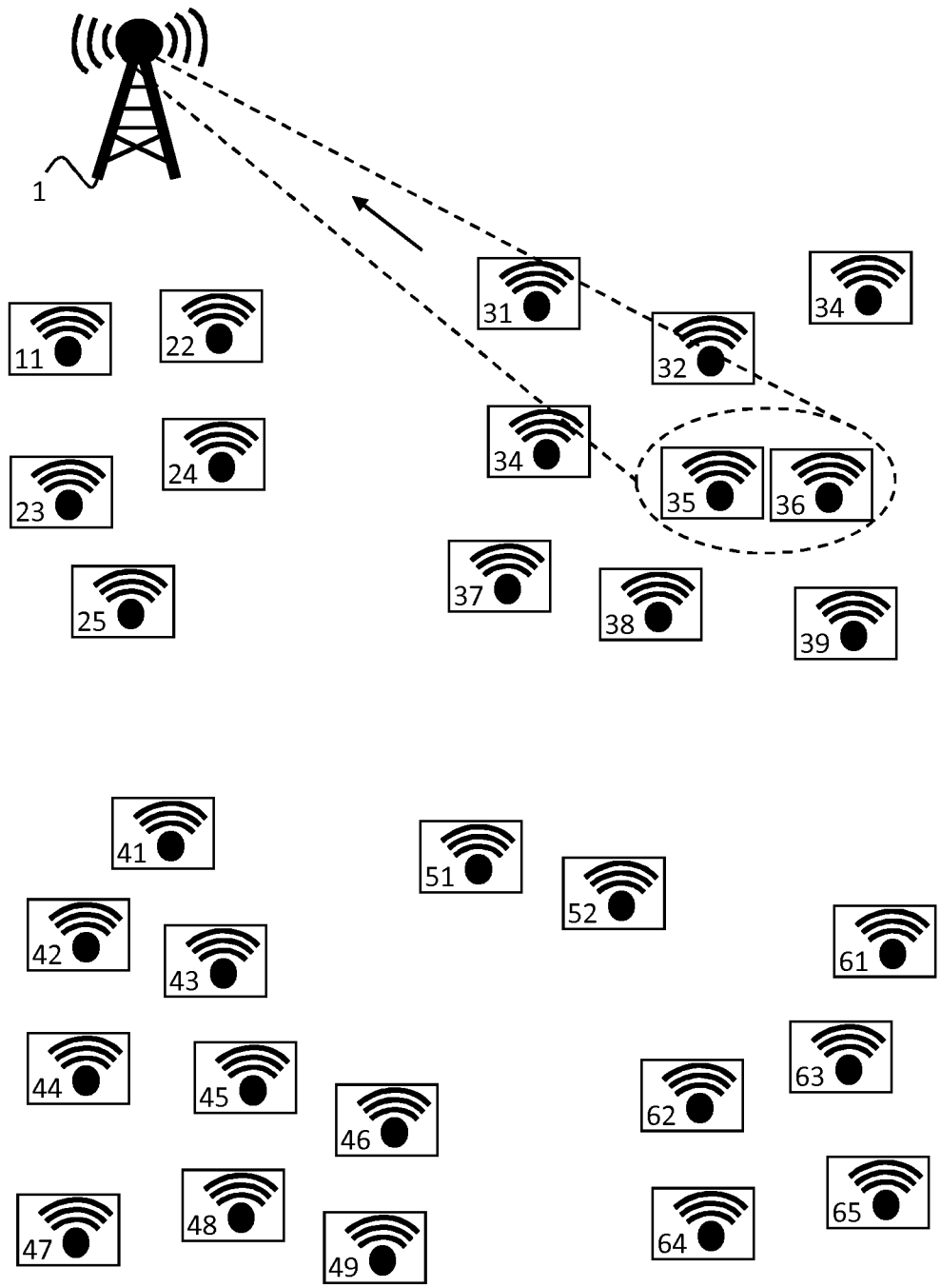
FIG. 4 depicts a second example of a receiving system receiving wireless signals from transmitting systems according to a schedule.

Based on the determined reception antenna weights, the base station creates a visit schedule. The base station may take into account the following:

- whether to visit sensor nodes individually with narrow node-specific beams or group-wise with wider beams, while hybrid solutions are also possible. The optimal choice depends amongst others on the base station's antenna and processing capabilities and on the relative merit of having the high antenna gains provided by narrow beams versus the attainable gains from using frequency multiplexing of multiple nodes when using wider, group-based beams. An example of the use of a group-based beam is shown in FIG. 4. FIG. 4 shows sensor nodes 35 and 36 using the same beam, e.g. at different moments or on different frequencies, to transmit wireless signals to the base station 1. The reception antenna weights for this beam may be determined, for example, by mathematically combining the reception antenna weights individually determined for each node of the group, i.e. sensor nodes 35 and 36, or by choosing reception antenna weights in the beam training process that match all nodes of the group simultaneously (and correspond to a wider listening beam).
- whether the beam serving a given sensor node (or group of sensor nodes) is generated by a single cell (and a single base station) or jointly by multiple cooperating cells (and multiple cooperating base stations)
- whether the beams directed to the different sensor nodes (or groups of sensor nodes) are generated successively or, to some extent, concurrently. If the beams directed to different sensor nodes can be generated concurrently, the base station may take into account whether the different sensor nodes can be served with the same frequency spectrum (e.g. because the sensor nodes are at sufficiently different locations and/or in sufficiently different directions).
- what resources, e.g. visit time (depending on both application layer aspects and on the attainable data rates for each given sensor node) and transmission spectrum (affecting the attainable data rates of the sensor nodes) should be allocated to the different beams and, in case of group-specific beams, how should these resources be shared by the different sensor nodes served by the same beam. This may involve the base station determining an estimated transfer time for receiving the data reports from each sensor node, e.g. based on the attainable data rates and the size(s) of the data reports.
- in what order the different beams are generated and, consequently, in which order the different sensor nodes are visited ('sweeping pattern').

Furthermore, the base station may be configured to receive information from a node specifying a requested periodicity of transmissions by the node (e.g. it requests to transmit once per hour) and determine a resource allocation in the visit schedule for the node based on the requested periodicity of transmissions. The base station may receive such information from one or more of the nodes, for example. Typically, the resource allocation further depends on the size of the data to be transmitted by the node and the estimated bit rate.

Additionally or alternatively, the base station may be configured to receive information specifying a requested time period from a node and determine a resource allocation for the node based on the requested time period. The resource allocation for the node may specify an allocated time period which falls within the requested time period, for example. The base station may receive such information from one or more of the nodes, for example.

The obtained 'visit schedule' then indicates exactly when, for how long, by which cell(s) and with what reception antenna weights each beam is generated and which sensor nodes are able to upload their sensing report by using this beam.

Since each node needs to know the part of the 'visit schedule' that is relevant for it, this information needs to be communicated, such that all sensor nodes learn when the beam will visit them and can wake up from their sleep mode and do the uplink transmission (i.e. from transmitting system to receiving system). The communication of the information can be done in unicast mode, using the currently still applicable wake-up schedule of the sensor nodes, or by broadcasting the information for a time period long enough to guarantee that all sensors have heard it. When conveying the 'visit schedule' information to the sensor nodes, the base station should preferably also send information about its clock, to ensure that the sensor nodes and the cell are synchronized (eliminate clock drift between the base station and the nodes). This can be done in absolute or in relative time.

During the subsequent reception phase the actual uploads of the sensing reports take place, applying the 'visit schedule' that was derived and communicated in the initialization phase. During the reception phase, the base station may also fine-tune and recommunicate the 'visit schedule'. For instance, through the actual transmissions (from the sensor nodes to the base station) the base station learns how long it really needs to generate each 'listening beam' to allow enough time for the visited sensor nodes to upload their data, yet not spend too much time, in order to efficiently utilize the time/frequency resources. Also, repetitive visits may enable the base station to establish a better synchronization with the sensor nodes, thereby reducing unused time resources before and/or after a sensor node's data report transmission and thus optimizing the visit schedule.

As mentioned previously, the anticipation of a calamity may trigger the periodicity of reporting and/or the report sizes to be adapted and therefore the visit schedule to be adapted. An application running on a sensor node or an application running on the application server may determine that a calamity is likely to occur based on the sensor data, for example. The new visit schedule is communicated to the sensor nodes. It may also be possible for a sensor node to transmit urgent data reports while the beam is not directed towards the sensor node, but the sensor node will normally still need to obtain the resource allocation to do so. The beams are meant to enhance power and spectral efficiency, but communication is also possible without them and may therefore be allowed.

A first example of an application which runs on application server 2 and sensor nodes 11,22-65 of FIG. 1 is a time-critical application, where the application layer requires high-frequency measurements with an immediate transmission deadline, e.g. every second a measurement report is expected. In this application, it is the application layer that effectively dictates the start of the visit times for each sensor node (and thus when each sensor node starts to transmit).

The visit schedule may then be determined, for example, as follows:

1. First, a decision is made on whether to use narrow beams (e.g. for receiving wireless signals from a single node) or wide beams (e.g. for receiving wireless signals from multiple, nearby nodes). Use of wider beams results in less complexity, lower channel gains and more robust transmissions in the sense of slight deviations in the transmission channel. For the narrow beams, the reverse applies. The decision may be based on e.g. (i) the application layer message sizes, as for very small message sizes a wider beam may suffice to still get the message across within the minimum transmission time interval; and (ii) the degree of channel variability due to e.g. (local) mobility, as wider beams are more robust against channel variations.
2. Since the start time of the visit of each sensor node is immediately dictated by the application layer, these do not need to be determined.
3. From these start times, it can be immediately derived which sensor nodes need to be concurrently served, either because the start times of the nodes are the same or because there is some overlap in their transmissions.
4. Subsequently, it is determined for each sensor node, based on channel feedback, whether it resides near the cell edge and benefits from multi-cell transmission, or, alternatively, whether single-cell transmission is preferred.
5. Then, for those sensor nodes that are to be served concurrently with one or more other sensor nodes, it is decided based on their channel feedback whether they can transmit simultaneously on the same frequencies or alternatively, whether frequency multiplexing needs to be applied.
6. Given an indication or (initial or updated) estimate of the message/data report size, it is then derived how much spectrum (e.g. Physical Resource Blocks) the transmission requires in order to convey the message within a single, or otherwise, a minimum number of Transmission Time Intervals (TTIs), considering also the total amount of available spectrum and the number of transmissions that are frequency multiplexed. Subsequently, a respective chunk of spectrum is allocated.
7. From the decisions made in the previous step, the end time of the visit of each sensor node is derived.

A second example of an application which runs on application server 2 and sensor nodes 11,22-65 of FIG. 1 is a delay-tolerant application, where the application layer requires low-frequency measurements with a highly flexible transmission deadline, e.g. every morning a measurement report is requested and it should be transferred sometime between noon and 2 pm. In this case, there is a degree of freedom for determining the start of the visit times for the sensor nodes.

The visit schedule may then be determined, for example, as follows:
1. A first step is performed as described in relation to the first application.
2. It is then determined for each sensor node, based on channel feedback, whether it resides near the cell edge and benefits from multi-cell transmission, or, alternatively, whether single-cell transmission is preferred.
3. Next, it is decided whether some nodes can be paired to be served concurrently. Other sensor nodes will be time-multiplexed, as will be described below.
4. Given an indication or (initial or updated) estimate of the message size, it is derived how much spectrum (e.g. Physical Resource Blocks) each transmission requires in order to convey the message within preferably a single, or otherwise, multiple (as few as possible) TTIs. In order to derive the number of required TTIs, it is checked whether the spectrum requirements fall below any spectrum limit set by the operator to be used for the given application. If not, the spectrum requirement is evenly split over a minimum number of successive TTI transmissions, such that the spectrum limit is honored and the transmission time is minimized.
5. Knowing the duration of all transmissions, their start times can be rather arbitrarily scheduled, avoiding time-domain overlap of the visits/transmissions.

In case the beam visit time is too short, or a node experiences a high Block Error Rate (BLER), or for any other reason which results in a node not completing its transmission within the scheduled visit time, a contingency plan may be in place to ensure the completion of the transmission. In such a case, the node might be able to request extra resources from the network in order to finish its transmission. The network would assign the necessary resources to the node and allow it to resume its transmission as soon as possible, also covering it with a new beam (if possible) in order to increase its experienced throughput. Furthermore, the network would apply this "lesson learned" to the next iteration of the visit time calculation and would adjust it accordingly in order to allow that node to complete its transmission within the original visit time, from now on.

As described above in relation to the application examples, the base station 1 may be configured to determine the schedule while taking into account which sets of the sensor nodes 11,22-65 are able to transmit wireless signals to base station 1 simultaneously. In the embodiment shown in FIG. 5, a single base station, i.e. base station 1, receives wireless signals from two sensor nodes, i.e. sensor nodes 11 and 52, concurrently. The base station 1 may be configured to determine whether it is able to receive from two nodes concurrently by determining whether a vector comprising the reception antenna weights of the first node and a vector comprising the reception antenna weights of the second node are orthogonal. If they are orthogonal, the base station 1 may determine that it is able to receive from both nodes concurrently and schedule simultaneous reception from both nodes. In this case, the antenna configuration may be based on the reception antenna weights of both nodes and the instances of the wireless signal (i.e. the slight variations of the same wireless signal due to the antennas and/or antenna elements being slightly apart) may be combined multiple times, each time with a different vector of reception antenna weights to extract a signal transmitted by the node to which the vector of reception antenna weights belongs and from which a transmission is expected, thereby resulting in multiple extracted signals.

Figure 5:
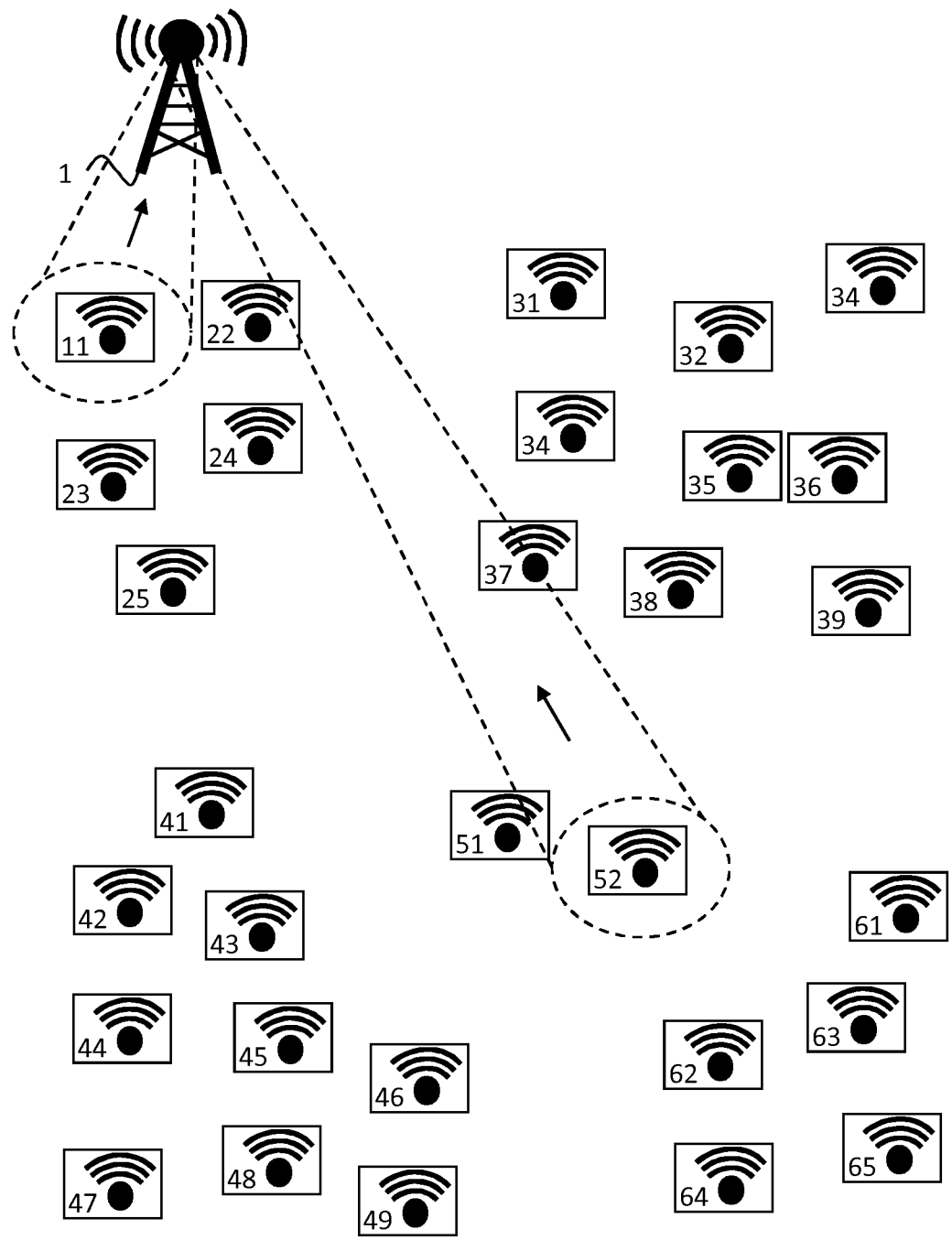
FIG. 5 depicts a third example of a receiving system receiving wireless signals from transmitting systems according to a schedule.

In the embodiments shown in FIG. 1, FIG. 4 and FIG. 5, the base station 1 determines the schedule. In an alternative embodiment, another network component/function determines the schedule. In case multiple base stations cooperate to receive wireless signals from nodes, the receiving system may comprise the multiple base stations. One of the multiple base stations may determine the schedule or a network component that is not a base station may determine the schedule.

The receiving system may be configured to determine the schedule while taking into account which one or more of the plurality of transmitting systems are each able to simultaneously transmit wireless signals to multiple base stations. In the embodiment shown in FIG. 6, the receiving system comprises two cooperating base stations 1 and 81 and the beams are thus generated by two cells (also referred to as multi-cell transmission).

The cells may cooperate in an LTE coordinated multipoint (CoMP) transmission scheme or in any other type of scheme that requires the cooperation among different eNBs/transmission points, for example, and in which a decision among various alternative cooperating sets needs to be taken. Such schemes may be virtual cells or virtual/vertical sectorization, for example. In the embodiment shown in FIG. 6, the reception antenna weights may be determined for a group of antennas and/or antenna elements which comprises the antennas and/or antenna elements of both base station 1 and base station 81.

Figure 6:
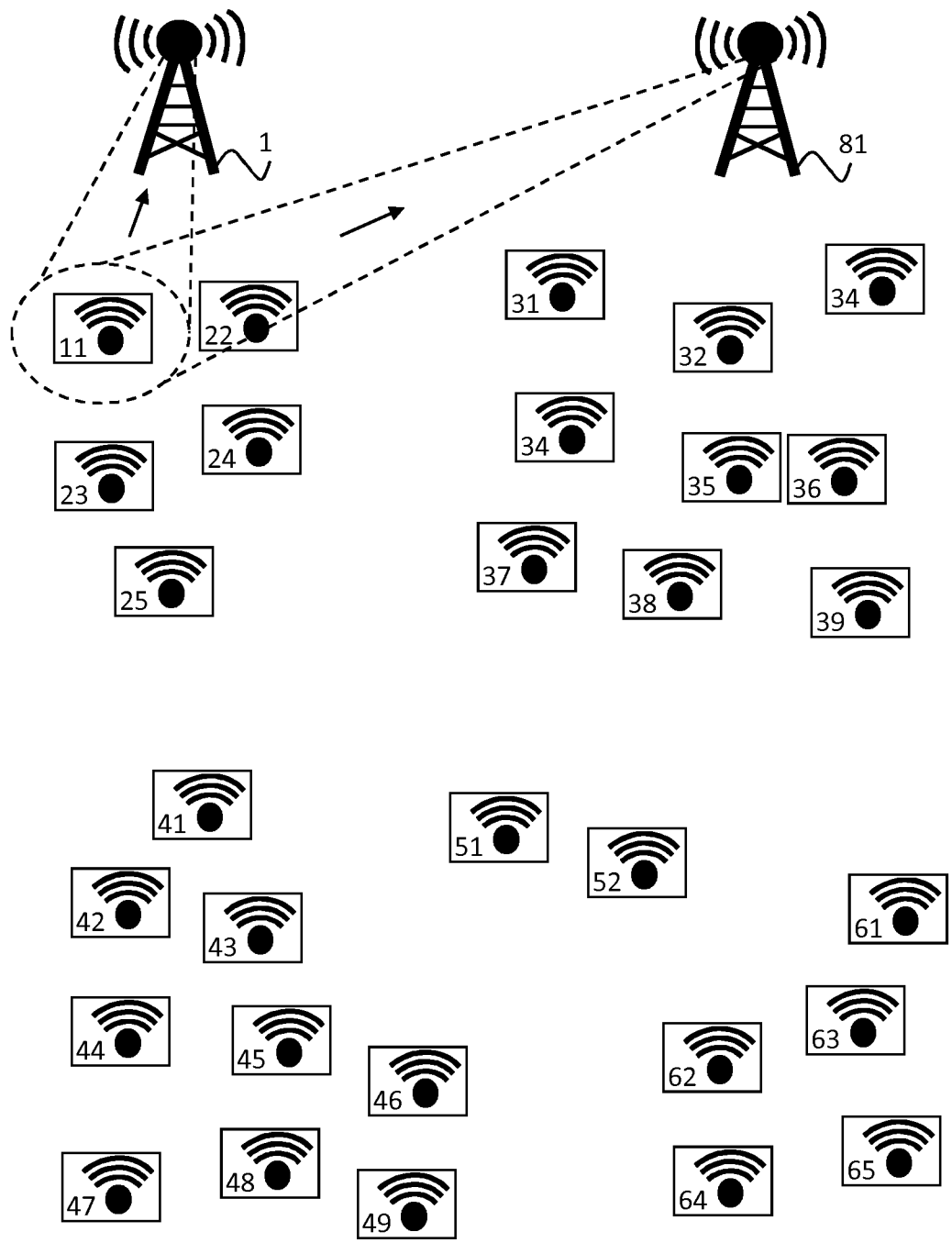
FIG. 6 depicts a fourth example of a receiving system receiving wireless signals from transmitting systems according to a schedule.
Figure 7:
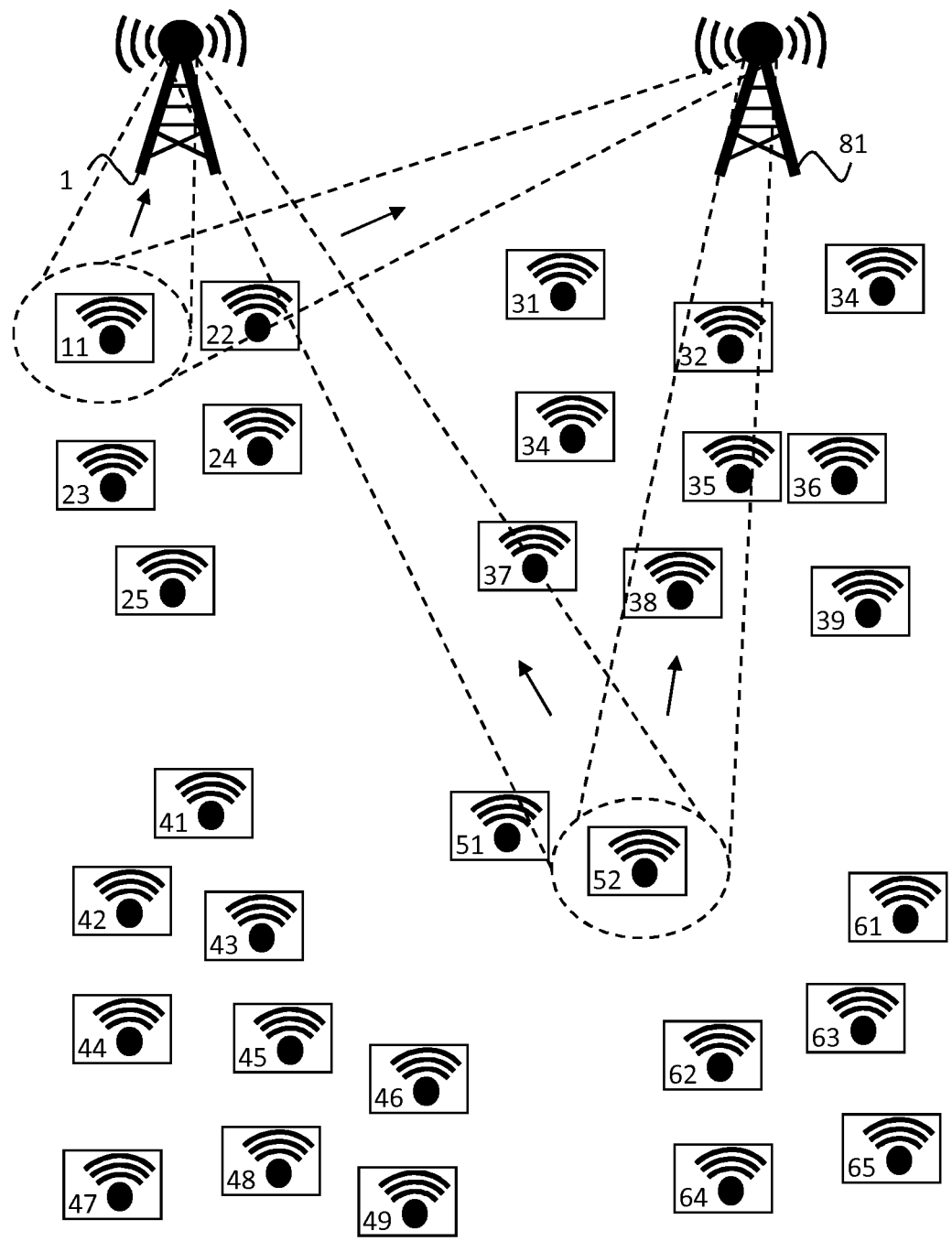
FIG. 7 depicts a fifth example of a receiving system receiving wireless signals from transmitting systems according to a schedule.

In the embodiment shown in FIG. 7, the receiving system comprises the same two cooperating base stations 1 and 81 shown in FIG. 6. In this embodiment, both base stations 1 and 81 (cooperatively) receive concurrently from two nodes, i.e. sensor nodes 11 and 52, using the same or different frequency resources. In an alternative embodiment, only one of the base stations 1 and 81 receives from two sensor nodes 11 and 52 concurrently. In this alternative embodiment, base stations 1 and 81 cooperatively receive wireless signals from one of sensor nodes 11 and 82 and only this sensor node transmits simultaneously to the two base stations 1 and 81. For example, base stations 1 and 81 cooperatively receive wireless signals from sensor node 11 and base station 1 simultaneously receives wireless signals from sensor node 52.

An example of a schedule determined by the receiving system of FIG. 7 is provided in Table 2 below.

TABLE 2

| Start time | End time | Bandwidth | Node(s) |
| --- | --- | --- | --- |
| 0 h:0 m:00 s.000 ms | 0 h:0 m:00 s.049 ms | 300 KHz | 11, 52 |
| 0 h:0 m:00 s.050 ms | 0 h:0 m:00 s.149 ms | 300 KHz | 22 |
| 0 h:0 m:00 s.150 ms | 0 h:0 m:00 s.199 ms | 300 KHz | 23 |
| 0 h:0 m:00 s.200 ms | 0 h:0 m:00 s.249 ms | 300 KHz | 24 |
| 0 h:0 m:00 s.250 ms | 0 h:0 m:00 s.349 ms | 200 KHz | 25 |
| ... | ... | ... | ... |

Figure 8:
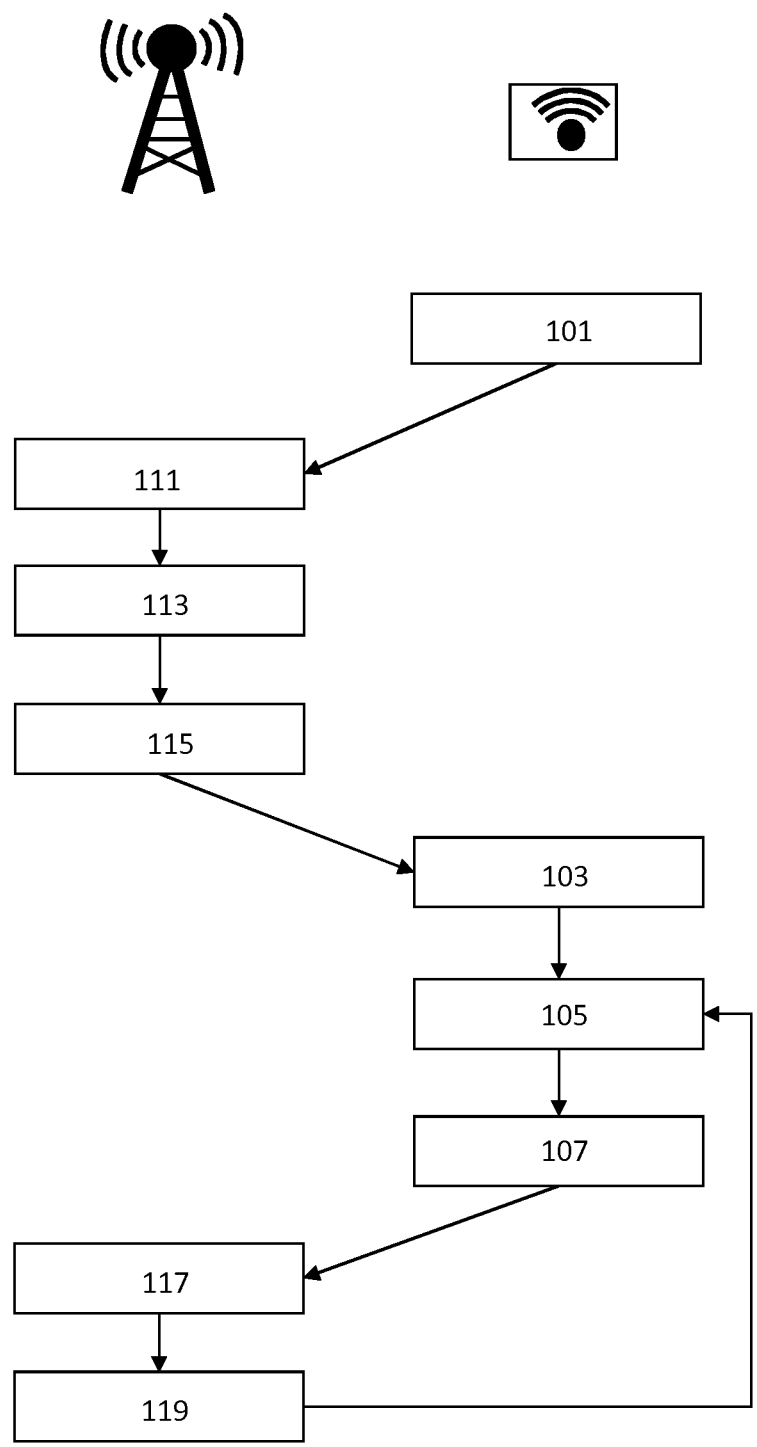
FIG. 8 is a flow diagram of embodiments of the methods of the invention.

Embodiments of the method of receiving wireless signals from a plurality of transmitting systems and the method of transmitting a wireless signal to a receiving system are shown in FIG. 8. In the embodiments shown in FIG. 8, the method commences with the receiving system and the transmitting systems participating in a beam training process in steps 101 and 111. In another embodiment, the beam training process is performed without the transmitting systems intentionally participating.

A step 101 is performed by each of the transmitting systems. In this embodiment, step 101 comprises the transmitting system transmitting a wireless signal to the receiving system a plurality of times. The receiving system has a plurality of antennas and/or antenna elements for receiving wireless signals from the transmitting system. Each time, the receiving system uses different reception antenna weights for the plurality of antennas and/or antenna elements to receive the wireless signal using receive beamforming and determines the quality of the reception antenna weights, e.g. the received signal strength. In step 111, the receiving system determines the best reception antenna weights for each transmitting system from the determined qualities of the reception antenna weights.

In step 101, a transmitting system may further transmit information to the receiving system which specifies a requested periodicity of transmissions by the transmitting system and/or a requested time period in which the transmitting system wants to transmit a wireless signal. In an alternative embodiment, this information is transmitted before or after step 101. This information is taken into account by the receiving system in a step 113.

Step 113 comprises the receiving system determining a schedule for receiving wireless signals from the plurality of transmitting systems. The schedule indicates a resource allocation for each of the plurality of transmitting systems. The resource allocation specifies an allocated time period and preferably further specifies allocated frequency resources and the periodicity/heartbeat of the allocation, e.g. specifies that the allocation repeats every 60 seconds. A step 115 comprises informing each transmitting system of the plurality of transmitting systems of the resource allocation to the transmitting system. A step 103 is performed by each of the transmitting systems. Step 103 comprises the transmitting system receiving a schedule from the receiving system. The schedule specifies a time period allocated to the transmitting system and preferably a frequency allocation, e.g. in terms of Physical Resource Blocks (PRBs) in case of LTE.

A step 105 comprises the transmitting system postponing transmitting a wireless signal representing a data unit to the receiving system until a moment which falls in the allocated time period. A step 107 comprises the transmitting system transmitting the wireless signal to the receiving system at this moment. A step 117 comprises the receiving system receiving a plurality of instances of the wireless signal via the plurality of antennas and/or antenna elements at a certain time. A step 119 comprises the receiving system combining the instances by using an antenna configuration which is based on at least reception antenna weights determined in relation to a transmitting system associated with this certain time in the resource allocation. Steps 105, 107, 117 and 119 are repeated multiple times, e.g. until the schedule has been completed or, if the schedule is continuous, until the schedule is adapted. If a transmitting system has nothing to transmit in its allocated time period, it may refrain from transmitting or it may transmit a short message indicating that it has nothing to transmit, for example.

Figure 9:
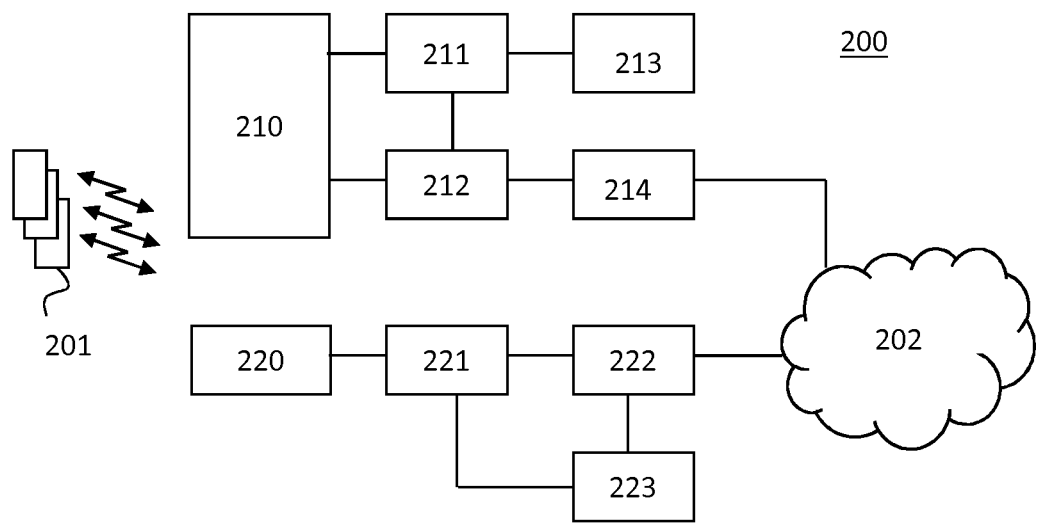
FIG. 9 is a block diagram of an exemplary cellular telecommunication system used in an embodiment of the device and the system of the invention.

In the telecommunications system 200 of FIG. 9, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 9 represents a GSM/GPRS or UMTS network.

For a GSM/GPRS network, a radio access network (RAN) system 220 comprises a plurality of nodes, including base stations (combination of a BSC and a BTS), not shown individually in FIG. 9. The core network system comprises a Gateway GPRS Support Node 222 (GGSN), a Serving GPRS Support Node 221 (SGSN, for GPRS) or Mobile Switching Centre (MSC, for GSM, not shown in FIG. 6) and a Home Location Register 223 (HLR). The HLR 223 contains subscription information for user devices 201, e.g. mobile stations MS.

For a UMTS radio access network (UTRAN), the radio access network system 220 also comprises a Radio Network Controller (RNC) connected to a plurality of base stations (NodeBs), also not shown individually in FIG. 9. In the core network system, the GGSN 222 and the SGSN 221/MSC are connected to the HLR 223 that contains subscription information of the user devices 201, e.g. user equipment UE.

The upper branch of the telecommunications system in FIG. 9 represents a next generation network, commonly indicated as Long Term Evolution (LTE) system or Evolved Packet System (EPS).

The radio access network system 210 (E-UTRAN), comprises base stations (evolved NodeBs, eNodeBs or eNBs), not shown individually in FIG. 9, providing cellular wireless access for a user device 201, e.g. user equipment UE. The core network system comprises a PDN Gateway (P-GW) 214 and a Serving Gateway 212 (S-GW). The E-UTRAN 210 of the EPS is connected to the S-GW 212 via a packet network. The S-GW 212 is connected to a Home Subscriber Server HSS 213 and a Mobility Management Entity MME 211 for signalling purposes. The HSS 213 includes a subscription profile repository SPR for user devices 201.

For GPRS, UMTS and LTE systems, the core network system is generally connected to a further packet network 202, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 10:
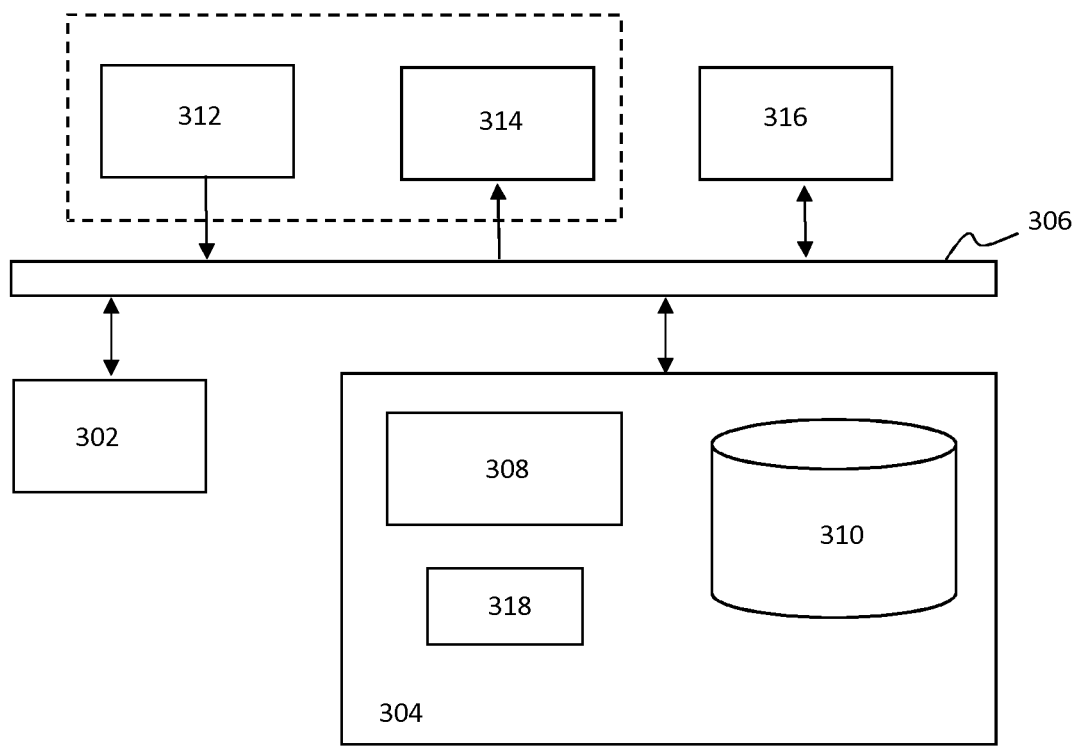
FIG. 10 is a block diagram of an exemplary data processing system for performing the methods of the invention.

FIG. 10 depicts a block diagram illustrating an exemplary data processing system that may perform the methods as described with reference to FIG. 8.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, he one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A receiving system for receiving wireless signals from a plurality of transmitting systems, said receiving system comprising a processor and a memory with computer code instructions stored therein, the memory operatively coupled to said processor such that the computer code instructions configure the processor to:
for each transmitting system of a plurality of transmitting systems, determine reception antenna weights for a plurality of antennas and/or antenna elements for receiving wireless signals from said transmitting system using receive beamforming,
determine a schedule for receiving wireless signals from said plurality of transmitting systems, said schedule indicating a resource allocation for each of said plurality of transmitting systems, said resource allocation specifying an allocated time period,
inform each transmitting system of said plurality of transmitting systems of said resource allocation to said transmitting system, and
for each resource allocation in said schedule, receive a plurality of instances of a wireless signal via said plurality of antennas and/or antenna elements and combine said instances by using an antenna configuration which is based on at least reception antenna weights determined in relation to a transmitting system associated with said resource allocation.

2. A receiving system as claimed in claim 1, wherein the processor of said receiving system is further configured to receive information from a transmitting system of said plurality of transmitting systems specifying how often said transmitting system wants to transmit a wireless signal and determine a resource allocation for said transmitting system based on how often said transmitting system wants to transmit a wireless signal.

3. A receiving system as claimed in claim 1, wherein the processor of said receiving system is further configured to receive information specifying a requested time period from a transmitting system of said plurality of transmitting systems and determine a resource allocation for said transmitting system based on said requested time period.

4. A receiving system as claimed in claim 3, wherein said resource allocation for said transmitting system specifies an allocated time period which falls within said requested time period.

5. A receiving system as claimed in claim 1, wherein the processor of said receiving system is further configured to determine for each of said plurality of transmitting systems an estimated transfer time for receiving data from said transmitting system and determine said schedule based on said estimated transfer times.

6. A receiving system as claimed in claim 1, wherein the processor of said receiving system is further configured to determine said schedule while taking into account which one or more of said plurality of transmitting systems are each able to simultaneously transmit wireless signals to multiple base stations.

7. A receiving system as claimed in claim 1, wherein the processor of said receiving system is further configured to determine said schedule while taking into account which sets of said plurality of transmitting systems are able to transmit wireless signals to a certain base station simultaneously.

8. A receiving system as claimed in claim 1, wherein said time is represented in Coordinated Universal Time or a network operator's time reference or said time represents a difference with the current time.

9. A receiving system as claimed in claim 1, wherein said schedule comprises a plurality of allocated time periods per transmitting system and/or the frequency, exact timing and/or transmission duration of a repeating cycle.

10. A receiving system as claimed in claim 1, wherein said resource allocation further specifies allocated frequency resources.

11. A transmitting system for transmitting a wireless signal to a receiving system, said transmitting system comprising a processor and a memory with computer code instructions stored therein, the memory operatively coupled to said processor such that the computer code instructions configure the processor to:
transmit information to a receiving system, said information specifying a requested periodicity of transmissions by said transmitting system and/or a requested time period in which said transmitting system wants to transmit a wireless signal,
receive a schedule from said receiving system, said schedule specifying a time period allocated to said transmitting system, said time period taking into account said information,
postpone transmitting a wireless signal representing a data unit to said receiving system until a moment which falls in said allocated time period, and
transmit said wireless signal to said receiving system at said moment.

12. A transmitting system as claimed in claim 11, wherein the processor of said transmitting system is further configured to start measuring a property at a predetermined amount of time before said moment, said data unit being the result of said measurement.

13. A method of receiving wireless signals from a plurality of transmitting systems, comprising:
for each transmitting system of a plurality of transmitting systems, determining reception antenna weights for a plurality of antennas and/or antenna elements for receiving wireless signals from said transmitting system using receive beamforming;
determining a schedule for receiving wireless signals from said plurality of transmitting systems, said schedule indicating a resource allocation for each of said plurality of transmitting systems, said resource allocation specifying an allocated time period;
informing each transmitting system of said plurality of transmitting systems of said resource allocation to said transmitting system; and
for each resource allocation in said schedule, receiving a plurality of instances of a wireless signal via said plurality of antennas and/or antenna elements and combining said instances by using an antenna configuration which is based on at least reception antenna weights determined in relation to a transmitting system associated with said resource allocation.

14. A computer program or suite of computer programs comprising at least one software code portion or a computer program product storing at least one software code portion, the software code portion, when run on a computer system, being configured for performing the method of claim 13.

15. A method of transmitting a wireless signal to a receiving system, comprising:

- transmitting information to a receiving system, said information specifying a requested periodicity of transmissions by a transmitting system and/or a requested time period in which said transmitting system wants to transmit a wireless signal;
- receiving a schedule from said receiving system, said schedule specifying a time period allocated to said transmitting system, said time period taking into account said information;
- postponing transmitting a wireless signal representing a data unit to said receiving system until a moment which falls in said allocated time period; and
- transmitting said wireless signal to said receiving system at said moment.

* * * * *

UNITED STATES PATENT AND TRADEMARK OFFICE
CERTIFICATE OF CORRECTION

PATENT NO. : 11,190,264 B2
APPLICATION NO. : 16/623728
DATED : November 30, 2021
INVENTOR(S) : Ljupco Jorguseski, Remco Litjens and Konstantinos Trichias Page 1 of 1

It is certified that error appears in the above-identified patent and that said Letters Patent is hereby corrected as shown below:

On the Title Page

In Item (71) Applicants: delete:
"NEDERLANDSE ORGANISATIE VOOR TOEGEPAST-NATUURWETENSCHAPPELIJK ONDERZOEK TNO, The Hague (NL)"
And insert:
-- NEDERLANDSE ORGANISATIE VOOR TOEGEPAST-NATUURWETENSCHAPPELIJK ONDERZOEK TNO, 's-Gravenhage (NL) --.

In Item (73) Assignees: delete:
"NEDERLANDSE ORGANISATIE VOOR TOEGEPAST-NATUURWETENSCHAPPELIJK ONDERZOEK TNO, The Hague (NL)"
And insert:
-- NEDERLANDSE ORGANISATIE VOOR TOEGEPAST-NATUURWETENSCHAPPELIJK ONDERZOEK TNO, 's-Gravenhage (NL) --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*